United States Patent [19]
Cochon et al.

[11] Patent Number: 5,835,591
[45] Date of Patent: Nov. 10, 1998

[54] DEMULTIPLEXING DEVICE

[75] Inventors: Etienne Cochon, Rennes, France; Albert Dorner, Lahr Kippenheimweiler, Germany; Charaf Hanna, Domeine, France

[73] Assignee: Thomson multimedia S.A., Boulogne Cedex, France

[21] Appl. No.: 771,387

[22] Filed: Dec. 19, 1996

[30] Foreign Application Priority Data

Dec. 9, 1995 [FR] France ..................................... 9515767

[51] Int. Cl.$^6$ ........................... H04N 7/167; H04N 7/12; H04J 3/06
[52] U.S. Cl. ........................... 380/10; 348/390; 348/420; 348/423; 370/474; 370/509; 370/515
[58] Field of Search ............................... 380/10; 370/474, 370/479, 509, 514, 515; 348/423, 420, 390

[56] References Cited

U.S. PATENT DOCUMENTS

| | | |
|---|---|---|
| 4,748,619 | 5/1988 | Vigarie et al. . |
| 5,228,028 | 7/1993 | Cucchi et al. ........................ 370/94.1 |
| 5,459,789 | 10/1995 | Tamer et al. ............................. 380/20 |
| 5,473,609 | 12/1995 | Chaney .................................. 370/94.1 |
| 5,475,754 | 12/1995 | Bridgewater et al. .................... 380/20 |
| 5,521,979 | 5/1996 | Deiss ........................................ 380/20 |
| 5,583,562 | 12/1996 | Birch et al. .............................. 348/12 |
| 5,619,197 | 4/1997 | Nakamura .............................. 348/423 |
| 5,668,841 | 9/1997 | Haskell et al. .......................... 370/516 |

FOREIGN PATENT DOCUMENTS

| | | |
|---|---|---|
| 0238382 | 9/1987 | European Pat. Off. . |
| 0506294 | 9/1992 | European Pat. Off. . |
| 0626770 | 11/1994 | European Pat. Off. . |
| 0651584 | 5/1995 | European Pat. Off. . |
| 2063626 | 6/1981 | United Kingdom . |
| 94 08399 | 4/1994 | WIPO . |

OTHER PUBLICATIONS

IEEE 1995 International Conference On Consumer Electronics, 7 Jun. 1995, Froidevaux et al: "MPEG1 and MPEG2 System Layer Implementation Trade–Off between Micro Coded and FSM Architecture" pp. 250–251.

*Primary Examiner*—Stephen C. Buczinski
*Attorney, Agent, or Firm*—Joseph S. Tripoli; Frederick A. Wein

[57] ABSTRACT

The object of the invention is a demultiplexing device.

This device is characterized in that it comprises means for storing data of a multiplexed data stream (4), programmable means for storing data filters (8), comparison means (19) between the data of the multiplexed data stream and the data filters, and means (12) for transferring data of the multiplexed data stream to storage means (5) in relation to the comparisons made.

The invention has a particular application in the field of digital television reception.

7 Claims, 5 Drawing Sheets

DEMULTIPLEXING DEVICE

FIELD OF THE INVENTION

The invention concerns a demultiplexing device. Its particular application is in the field of digital television.

BACKGROUND OF THE INVENTION

Digital signal transmission means require receiving circuits which analyse their contents to determine if the data transmitted are of interest for a given application. For example, this is the case in MPEG2 type compressed, digital television systems. In this type of system a large number of channels can be multiplexed. The data in each channel include several layers which also have to be analysed.

It is desirable to use a flexible demultiplexing device.

SUMMARY OF THE INVENTION

The object of the invention is a demultiplexing device characterised in that it comprises means for storing data of a multiplexed data stream, programmable means for storing data filters, comparison means between the data of the multiplexed data stream and the data filters, and means for transferring data of the multiplexed data stream to storage means in relation to the comparisons made.

According to a particular way of carrying out the invention, the device according to the invention furthermore contains at least one state machine organised according to a layer from among the hierarchical layers of data in the multiplexed data stream.

According to a particular way of carrying out the invention, the programmable means for storing data filters include a memory containing for each state machine filter values for the layer which corresponds to this machine.

According to a particular way of carrying out the invention, said layer is the MPEG2 transport layer, the filter values containing at least one of the following types: PID, continuity counter, synchronisation bit.

According to a particular way of carrying out the invention, the filter values of the continuity counter correspond to the next value expected in the multiplexed data stream.

According to a particular way of carrying out the invention, said layer is the MPEG2 section layer, the filter values containing at least one of the following types: table identifier, start of section pointer, section length.

According to a particular way of carrying out the invention, said layer is the MPEG2 elementary stream packet layer, the filter values containing the stream identifier.

According to a particular way of carrying out the invention, said device furthermore contains a multiplexer, one input of which is connected to the output of the means for storing data of the multiplexed data stream, and a second input of which is connected to the output of a descrambler, the input of the descrambler also being connected to the output of the means for storing the data of the multiplexed data stream, the multiplexer being controlled by the state machine or machines.

The object of the invention is also a digital television decoder, characterised in that it contains the above demultiplexing device.

Other advantages and features of the invention will be revealed by the description of a particular, non-limiting, exemplary embodiment illustrated by the accompanying figures.

DETAILED DESCRIPTION OF INVENTION

In the following, when this is considered necessary for the clarity of the explanation, the terms in bold or between parentheses and inverted commas give a designation from the MPEG2 specification.

The data relative to an "elementary data stream" are transported in PES ("packetized elementary data stream") packets . Each PES contains a data stream identifier ("data stream_id"). Each elementary data stream (audio, video or other) corresponds to a component of a programme. The elementary data streams of the same programme are multiplexed for transmission. A supplementary layer, the transport layer, is used for this transmission. A transport packet contains a packet identifier (denoted PID). The relationships between PIDs and the elementary data streams are established by means of truth tables. The truth tables form part of the programme-specific information ("PSI"), which is also transported in the transport packets in the form of sections. The size of a section or a PES can be greater than the payload of a transport packet.

Reference to the MPEG2: ISO/IEC 13818 standard, and more specifically part 1 "Systems", provides full details of the structure and format of the data in particular.

Figure 1:
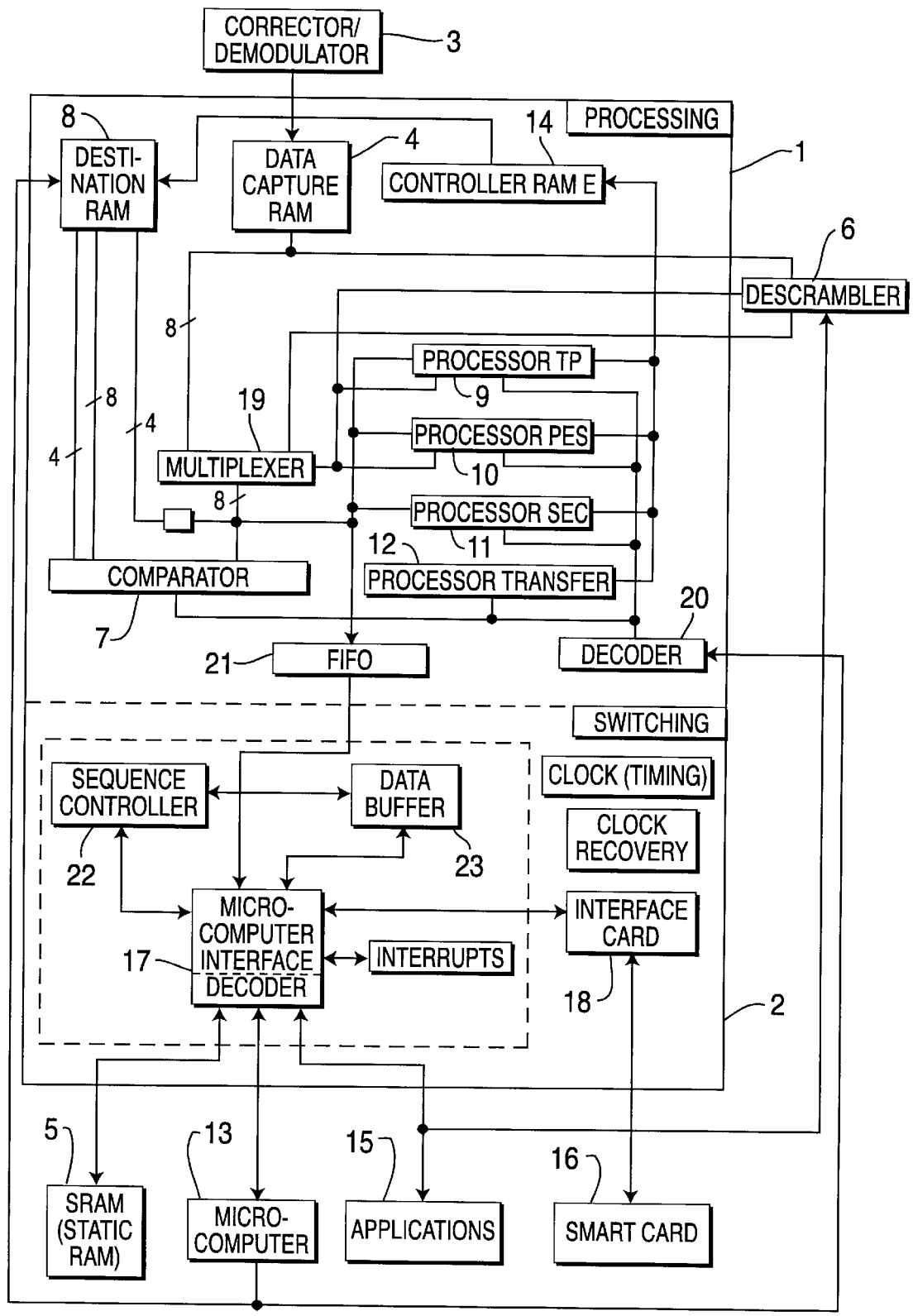
FIG. 1 shows a block diagram of a demultiplexer according to the invention in a digital television receiving system.

FIG. 1 is a block diagram of a demultiplexer according to the present exemplary embodiment. The demultiplexer comprises two sections: a data processing part (1) and a switching part (2) connected to the applications and peripherals.

The data processing part receives a multiplexed data stream from a demodulation and error correction circuit 3 connected to a tuner, not shown. According to the present exemplary embodiment, it extracts up to nine transport packets corresponding to nine distinct PIDs.

The data processing part uses the headers and flags of the transport packets and the PESs to access the useful data. Certain fields are sent via the switching part 2 to a static RAM 5 used as a buffer by the decoder. If the useful data are scrambled, then they are first of all transmitted to a descrambling circuit 6 before being processed.

A FIFO memory between the processing section and the scrambling section allows the two entities to operate at different speeds.

The multiplexed data steams are stored in an asynchronous data capture RAM 4 and are read out as and when required.

Two steps are generally employed to analyse data stored in the RAM 4: one step is to read an eight-bit byte in this RAM, then a comparison step by a comparator 7, with one byte stored in a destination memory 8. Not all the bytes stored in the RAM 4 are compared. This comparison is only made for the bytes for which this operation is necessary. The processing part decides which bytes to compare and, depending on the result of the comparisons, also decides to reject a transport packet or to transfer the useful data to the switching part.

The comparison is carried out only on bytes which have been descrambled if needed. A multiplexer 19 selects the output of the data capture RAM 4 and of the descrambler 6. The output of the multiplexer 19 is connected to one of the two inputs of the comparator 7. The other input of this comparator is connected to the output of the destination memory 8. Four masking bits from this destination memory are also taken into account by the comparator when carrying out the comparisons.

The reading of the data capture RAM 4 is initiated by one of the processors (TP, PES and SEC, 9. 10 and 11, respectively). This RAM is organised as a FIFO push-up stack.

A microcontroller µC (13) controls the destination RAM 8 and loads the predefined destination bytes searched for in the transport packets.

The processors 9 to 12 control the reading of the bytes in the destination RAM via this RAM's controller.

For each comparison, one byte from the RAM 8 and one byte from the data capture RAM 4 is transmitted to the comparator 7. The result of the comparison is transmitted to the processor which has initiated it in the form of a "1" bit if the comparison is positive.

Four processors are used in the present exemplary embodiment:

(a) the processor TP (9) handles the bytes involved with the transport layer, (b) the processor PES (10) handles the bytes involved with the layer of elementary data stream packets, (c) the processor SEC (11) handles the bytes involved with the section layer, (d) the processor XFER (12) handles the transfer of useful data to the switching part.

Each of the processors 9 to 12 contains a state machine, as well as AND/OR counter registers. Only one processor is active at a given moment. During its active phase, a processor usually carries out the above-mentioned reading and comparison steps, then activates another processor before deactivating itself. The layers and the data bytes received in the transport packets determine the activation and operating sequences of the processors.

When a processor is activated, it starts to process the next available data byte in the data capture RAM 4. The next comparison will be made with the byte read into the destination RAM directed by a pointer value specifically maintained by each processor.

Simply put, when a processor has to transfer data to the switching part it activates the processor XFER 12 before deactivating itself.

The multiplexer 19 is controlled either by the processor TP or the processor PES. This depends on what level (transport packets or elementary data stream packets) at which the scrambling is implemented.

A decoder 20 handles the decoding of the addresses for the destination memory, either from the microcontroller or from one of the processors. It also handles the decoding of the addresses of the processor registers when the microcontroller needs to access them.

The decoder also contains registers in which parameters such as data_stream_id and data_stream_type are stored for each elementary data stream. All information relating to the processed data stream at a given moment is available from the decoder for the other entities of the circuit. (This data stream is known as the data_stream_id parameter, which will be dealt with further in relation to the transport processor TP).

The different processors will be looked at in more detail later on.

The switching part of the demultiplexer receives multiplexed data from the processing section, as well as a data stream identifier (data stream_id).

According to a particular way of carrying out the invention, called the buffered mode, the switching part controls several buffer areas in the static RAM 5, these buffer areas having been allocated by the microcontroller 13. The switching part stores the data received in the appropriate buffer areas in relation to the data stream identifier.

Several interfaces 17, 18 handle the communication between the static RAM 5, the microcontroller and the external applications 15 (audio decompressor, video decompressor, teletext . . .) and 16 (smart card for access control and payment of services). Each application reads the data relating to it in the buffer areas reserved for it.

The sequence controller 22 and the data buffer 23 control the sequencing of the access to the static memory 5 and the addressing of the buffer areas in this memory, respectively.

The microcontroller interface 17, more particularly, switches the address buses and the data buses between the memory 5, the smart card interface, the microcontroller and the applications.

The following part of the description more specifically concerns the destination memory.

According to the present example, the destination memory is a 128×12 bit random access memory. It is used to store filtering bytes. Each byte has a mask of 4 bits allowing certain bits of the byte to be masked during the comparison. 12 bits, of which 8 are for the byte being compared and 4 for masking, are stored at each address of the memory 8 and are used in parallel by the comparator 7. The resulting sixteen selectable bit masks are predefined and stored in the comparator 7.

The processors TP, PES and SEC use the destination memory for filtering. Each processor uses one programmable part of the destination memory.

The first byte of the destination memory (address 0) corresponds to the PES packet and therefore to the processor PES. This byte identifies the type of data stream ("stream_id").

The number of addresses of the part corresponding to the processor TP depends on the number of identifiers PID to be filtered. For a PID having a length of 13 bits, two bytes are necessary, which corresponds to two addresses per PID. Furthermore, a value expected from the continuity counter (ECC) is stored per PID. In the latter case, it is necessary to add a synchronisation byte to it, which is identical for all the transport packets and is consequently stored once only, starting from the part of the memory attributed to the processor TP.

The number of addresses for this second part is therefore:
(number of PIDs to be filtered×3)+1

The organisation of this second part is:

synchronisation byte
PID H data stream #0
[PID H data stream #1]
[PID H data stream #2]
. . .
[PID H data stream #n]
PID L data stream #0

```
    [PID L data stream #n]
    ECC data stream #0
    ...
    [ECC data stream #n]
```

According to the present exemplary embodiment, n is always less than 9.

Concerning the part of the destination memory reserved for the section processor SEC, the number of reserved addresses is also a function of the number of PIDs. The memory contains as many "section/stream" fields as there are distinct data streams. Each field has its own start address (section_TR_start_address).

The first byte of each field is zero: it provides verification that the start of section pointer ("pointer_field") is zero.

The following bytes correspond to the table identifiers ("table_id"). A certain number of tables can be defined by the user; the number of identifiers is variable and is equal to filter_nb for each field.

Then comes a zero semi-byte which will be compared to the high semi-byte of the section length, in order to verify if the section overflows the transport packet.

The last part of each field contains a certain number (filter_nb) of groups of bytes of a length filter_length, which are to be compared to the same number of packet bytes. The number of comparisons to be made for each packet byte will be filter_nb.

```
    start of section pointer
    table_id #0
    [table_id #1]
    ...
    [table_id #(n-1)]
    high semi-byte of section length
    address #0,0
    [address #0,1]
    ...
    [address #0, (n-1)]
    ...
    [address #1,0]
    [address #1,1]
    ...
    [address #(filter_length -1), (filter_nb-1)]
    The total number of bytes in each field is:
    filter_nb · (filter_length + 1) + 2
```

Table 1 shows an example of the destination memory configuration for nine PIDs and an example of section filtering for two different table_ids and two groups of 16-bit bytes (that is to say filter_nb=2 and filter_length=2).

| Memory address | Mask | Memory data | Used by processor | Remarks |
|---|---|---|---|---|
| 0 | 0 | BF | PES | Private stream 2 |
| 1 | 0 | 47 | TP | Synchronisation byte |
| 2 | 3 | 5 MSB of PID0 | TP | |
| 3 | 3 | 5 MSB of PID1 | TP | |
| ... | | | ... | |
| A | 3 | 5 MSB of PID8 | TP | |
| B | 0 | 8 LSB of PID0 | TP | |
| C | 0 | 8 LSB of PID1 | TP | |
| ... | | | ... | |
| 13 | 0 | 8 LSB of PID8 | TP | |
| 14 | F | | TP | ECC of data stream 0, complete masking, updated by TP |
| ... | | | ... | |
| 1C | F | | TP | ECC of data stream 8, complete masking, updated by TP |
| 1D | 0 | 00 | SEC | Start of section pointer for the first section/stream |
| 1E | du | Defined by the user (du) | SEC | First value sought for table_id (table_id #0) |
| 1F | du | | SEC | Second value sought for table_id (table_id #1) |
| 20 | 4 | 0 | SEC | Semi-byte of section length |
| 21 | du | | SEC | First byte of first group |
| 22 | du | | SEC | First byte of second group |
| 23 | du | | SEC | Second byte of first group |
| 24 | du | | SEC | Second byte of second group |
| 25 | 0 | 00 | SEC | Start of section pointer for the second section/stream |
| 26 | du | | SEC | First value sought for table_id (table_id #0) |

TABLE 1

| | First filter/TR_addr | Second filter/TR_addr |
|---|---|---|
| table_id | Address 1E | Address 1F |
| section length high | | |
| section length low | | |
| address #0 | Address 21 | Address 22 |
| address #1 | Address 23 | Address 24 |

The data are usually written into the destination memory 8 by the microcontroller 13. A special case in this context is notably the continuity counter, which is written by the processor TP (9).

In order to write to the destination memory, the microcontroller uses a pointer known as trp. The processors can access data of interest to them by programming the pointer trp.

The value awaited from the continuity counter ECC, corresponding to the last transport packet extracted from the multiplexed data stream for a given elementary data stream, is stored in the destination memory at the appropriate address. This value corresponds to the continuity counter value extracted from the last filtered transport packet, incremented by one unit. ECC is used during the comparison with the continuity counter of the next transport packet having the same PID.

Given that the first value of ECC is not defined, it is initially completely masked by selecting the appropriate bit masking configuration during the initial writing to the destination memory by the microcontroller. When the first valid value of ECC is written, the masking bits are also re-written.

The controller 14 of the destination memory carries out the multiplexing between the requests for access to this memory. These requests can come from the microcontroller and the processors.

The following part of the description concerns the transport layer processor.

The processor TP is the first processor that is active for all the transport packets.

According to the present exemplary embodiment, the bytes read and processed by this processor are as follows:

| (a) | sync_byte | 8 bits |
| --- | --- | --- |
| (b) | transport_error_indicator | 1 bit |
|  | payload_unit_start_indicator | 1 bit |
|  | transport_priority | 1 bit |
|  | PID_H | 5 bits |
| (c) | PID_L | 8 bits |
| (d) | transport_scrambling_control | 2 bits |
|  | adaptation_field_control | 2 bits |
|  | continuity_counter | 4 bits |

All these designations correspond to the MPEG2 terminology. The data are read byte by byte. Certain variables such as transport_priority are not taken into account, but are read as if belonging to a byte containing variables which should be processed.

According to the present exemplary embodiment, up to nine data streams can be extracted. For example, these data streams are:

programme association table stream (packets with PID #1)

conditional access table stream (packets with PID #2)

programme allocation section stream video stream audio stream

Teletext stream rights of access management messages stream (EMM)

rights of access check messages stream (ECM)

programme guide stream

The nine PID values are not specifically allocated by the demultiplexer. The microcontroller selects the data streams by loading the PIDs into the destination memory. Only the transport packets identified by one of these nine PIDs are processed.

The microcontroller assigns to each stream a type of stream (stream_type) which can take one of the following values: audio, video, section, other.

Figure 2:
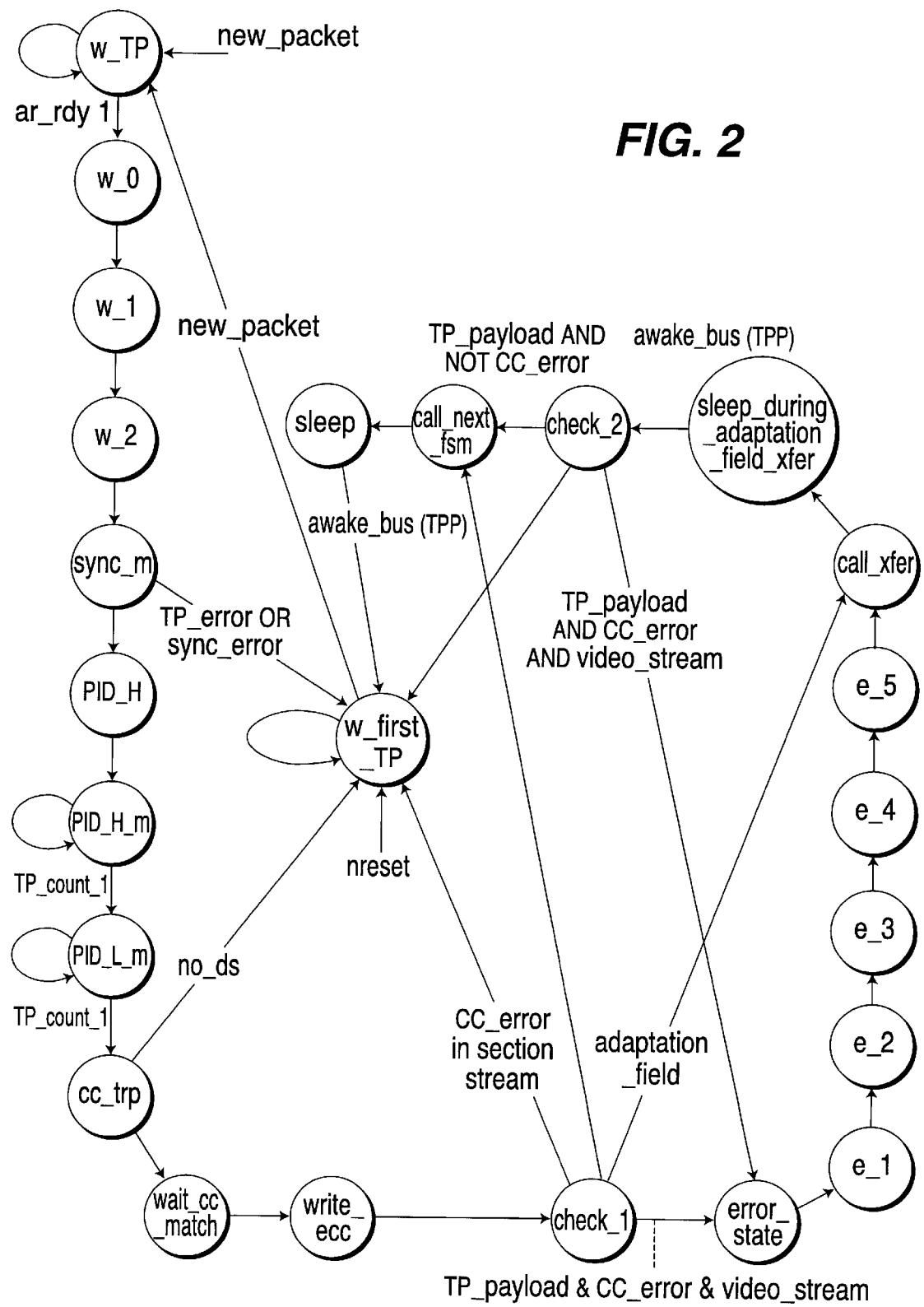
FIG. 2 is a state diagram of the transport processor TP of the demultiplexer in FIG. 1.

FIG. 2 is a state diagram of the state machine of the processor TP. The state indicated in bold (w_first_TP) is considered as the initial state of the state machine for the rest of the description. When a new packet is expected, the processor TP waits for a signal from the data capture memory, indicating that the latter is ready to be read (w_TP, state, ar_rdyl signal). Now follow three wait states concerned with the physical execution and with the ratios of the data capture memory write and read timers.

If the synchronisation byte sync_byte is incorrect (i.e. different from 0x47), the packet is rejected (sync_m state), and there is a return to the initial state.

If the transport_error_indicator flag is "1", indicating that the transport packet data contain at least one irrevocable error, then the processor TP likewise rejects the packet (likewise sync_m state, TP_error condition).

The processor TP compares the high (_H) and low (_L) bits of the nine PIDs with the nine destination PIDs stored in the destination memory 8. The comparison is first made with the nine high bytes, then with the nine low bytes. A nine-bit register DSid_reg of the processor TP is loaded with the result, termed the data-_stream_id. A "1" bit signifies that there is coincidence between the PID of the processed packet and one of the destination PIDs. The position of the bit indicates the particular PID involved.

If no bit of the register is "1", then the transport packet is rejected. This test is carried out in the cc_trp state, which is the calculation state of the pointer of the destination memory indicating the address of the expected continuity counter ECC for the filtered PID. If this address is invalid, the error is recognized (no_ds).

The processor TP verifies that for a packet corresponding to a given PID, the continuity counter continuity_counter is indeed equal to the expected value ECC. For this it waits for the result of the comparison made by the comparator 7 (wait_cc_match state). It then writes the new, expected ECC value.

Next is a verification stage check_1. A number of cases are envisaged:

(a) If there is a payload in the packet (a payload corresponding to a PES or a section) and the continuity counter has the correct value, the processor PES or the processor SEC is activated (call_next_fsm state). It is the payload_unit_start_indicator flag which indicates the presence of the start of a PES or of a section in the payload of the transport packet. This flag is stored in a register start_indic_reg.

(b) If the packet contains an elementary stream of the video type, but there is an error in the continuity of the packets (continuity counter differs from the expected value), then a certain number of error bytes is inserted into the payload and transferred to the switching part (error_state, e_x and call_xfer states). The switching part stores these bytes in the appropriate buffer area of the static RAM. The video decoder for which the payload is intended recognises this byte configuration and processes the data as a result.

(c) If the adaptation_field_control pair indicates the presence of an adaptation field within the transport packet, the processor TP activates the processor XFER to transfer bytes from this field to the switching part.

(d) If the continuity counter does not have a correct value, and the stream is of the section type, then the packet is rejected.

During the active phase of the processor XFER, the processor TP is in a sleep state, waiting to be reactivated by the processor XFER. If the transport packet also contains a payload in addition to the adaptation field, and the continuity counter has a correct value, the processor TP activates one of the processors SEC or PES (check_2, then call_next_fsm state).

In the opposite case, the processor TP is only activated for the following transport packet (check_2 state).

When one of the processors SEC or PES has been activated, the processor TP enters the sleep state and waits to be reactivated by these processors.

The transport_scrambling_control pair indicates if and in what way the payload of the transport packet is scrambled. These bits are used by the processor TP to configure the descrambler 6 and to control the multiplexer 19.

To reject a transport packet, the processor TP de-activates itself simply by waiting for a re-initialisation signal which coincides with the arrival of a new packet.

The processor TP has three registers. The first register (DS_count_reg) contains the maximum number of different packets to be extracted and is controlled by the microcontroller; the second one (TP_count_reg) is used by the processor TP as a loop index (number of comparisons to be made per byte read into the data capture memory). The third register has already been mentioned.

The following part of the description concerns the elementary stream packet processor PES.

Figure 3:
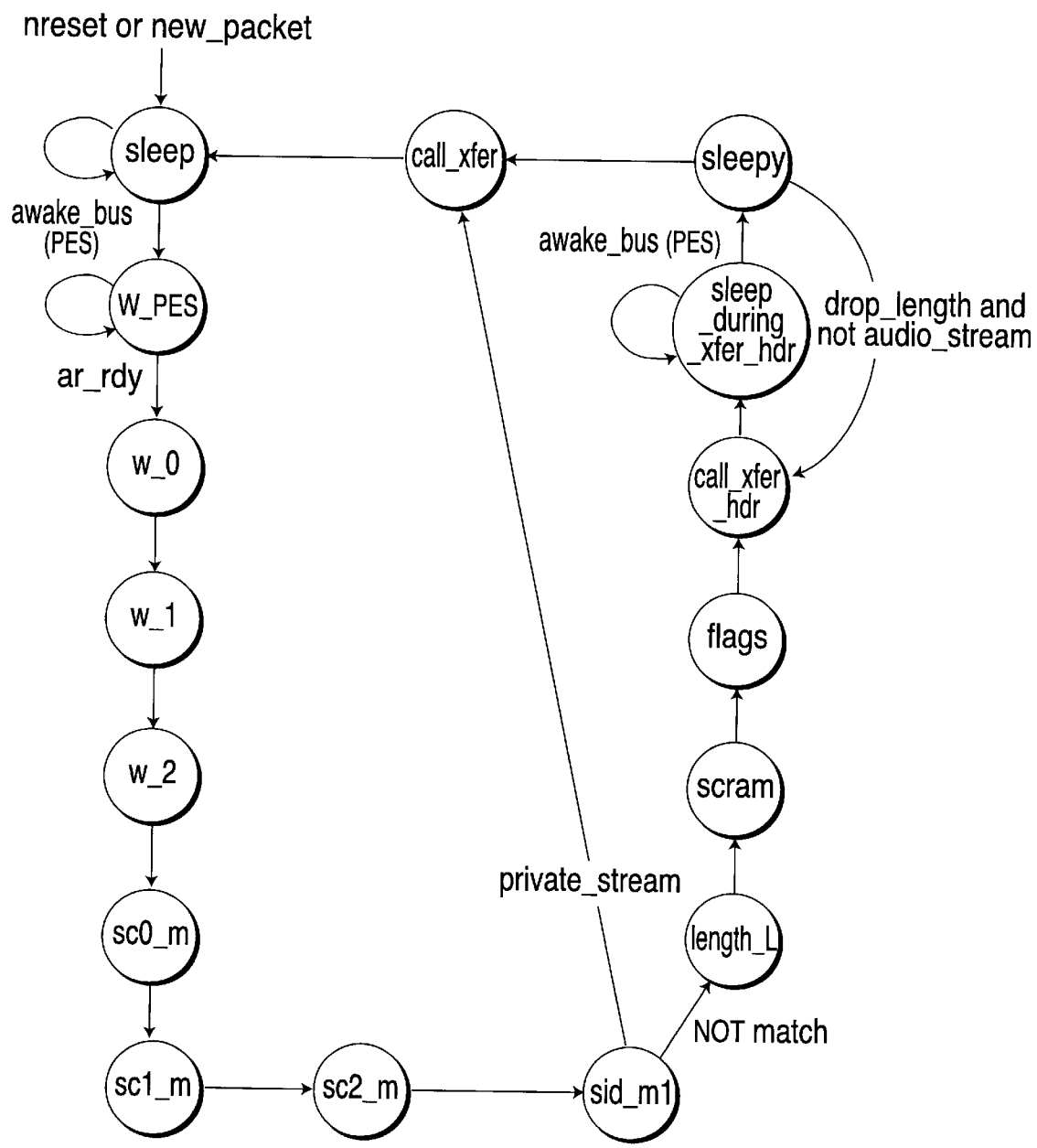
FIG. 3 is a state diagram of the elementary data stream packet processor PES of the demultiplexer in FIG. 1.

According to the present exemplary embodiment, this processor contains a state machine (illustrated in FIG. 3), as well as nine registers of two bits each. It is activated by one of the two processors TP or XFER.

The following bytes are read by the processor PES. Only the data shown with an asterisk are actually tested by the processor. The other data are masked during the comparisons, which, moreover, is the case with the other processors. However, the entire header of the PES is stored so as to be transferred to the switching part.

| (a, b, c) | packet_start_code_prefix | 24 bits |
|---|---|---|
| (d) | stream_id* | 8 bits |
| (e) | PES_packet_length_high | 8 bits |
| (f) | PES_packet_length_low | 8 bits |
| (g) | "10" | 2 bits |
|  | PES_scrambling_control | 2 bits |
|  | PES_priority | 1 bit |
|  | data_alignment_indicator | 1 bit |
|  | copyright | 1 bit |
|  | original_or_copy | 1 bit |
| (h) | PTS_DTS_flags | 2 bits |
|  | ESCR_flag | 1 bit |
|  | ES_rate_flag | 1 bit |
|  | DSM_trick_mode_flag | 1 bit |
|  | additional_copy_info_flag | 1 bit |
|  | PES_CRC_flag | 1 bit |
|  | PES_extension flag | 1 bit |

At first, the processor PES is in a sleep state. It is activated by an awake_bus (PES) signal coming from one of the processors TP or XFER. The processor then waits for the data capture memory to be ready for the reading of the next byte of the current transport packet (W_PES state and ar_rdy signal). As for the processor TP, a certain number of wait states are necessary to synchronise the data capture memory and the processor PES. The latter reads the three bytes a, b and c corresponding to packet_start_code_prefix (scx_m states), then the stream identification byte stream _id (sid_m1 state). If the stream is a private stream (see table 2–10 of the MPEG2 systems document), then the processor XFER is activated (call_xfer state) in order to transfer the payload of the PES packet to the switching part. In the present exemplary embodiment it is assumed that the private streams are completely taken care of by the corresponding applications, and that they do not require descrambling by the descrambler 6.

In the opposite case, the bytes e and f are read, then byte g (scram state), from which the PES_scrambling_control pair are derived, which indicate scrambling of the payload of the PES packet. As before, these bits are used to control the descrambler 6 and the multiplexer 19. Given that the scrambled payload of a PES packet can be distributed among several transport packets, but that only the first transport packet contains the PES_scrambling_control pair, these bits are stored in a two-bit register. The processor PES contains one register per stream, that is to say nine in this exemplary embodiment. The registers are updated by the headers of the following PES packets.

After reading and processing of the g byte, the processor reads the h byte. This one contains a certain number of flags. Depending on the capabilities of the decoder incorporating the demultiplexer, these flags can be set at this time to values that are compatible with these means.

The purpose of the two following states is to transfer the header of the PES packet to the switching part. During this time, the processor PES is set to the sleep state. When the transfer is complete, the processor PES is re-activated by the processor XFER. The processor PES then initiates the transfer of the payload of the PES packet (call_xfer state), as before.

Once this transfer is initiated, the processor PES goes into the sleep mode.

The following part of the description concerns the section processor SEC.

Figure 4:
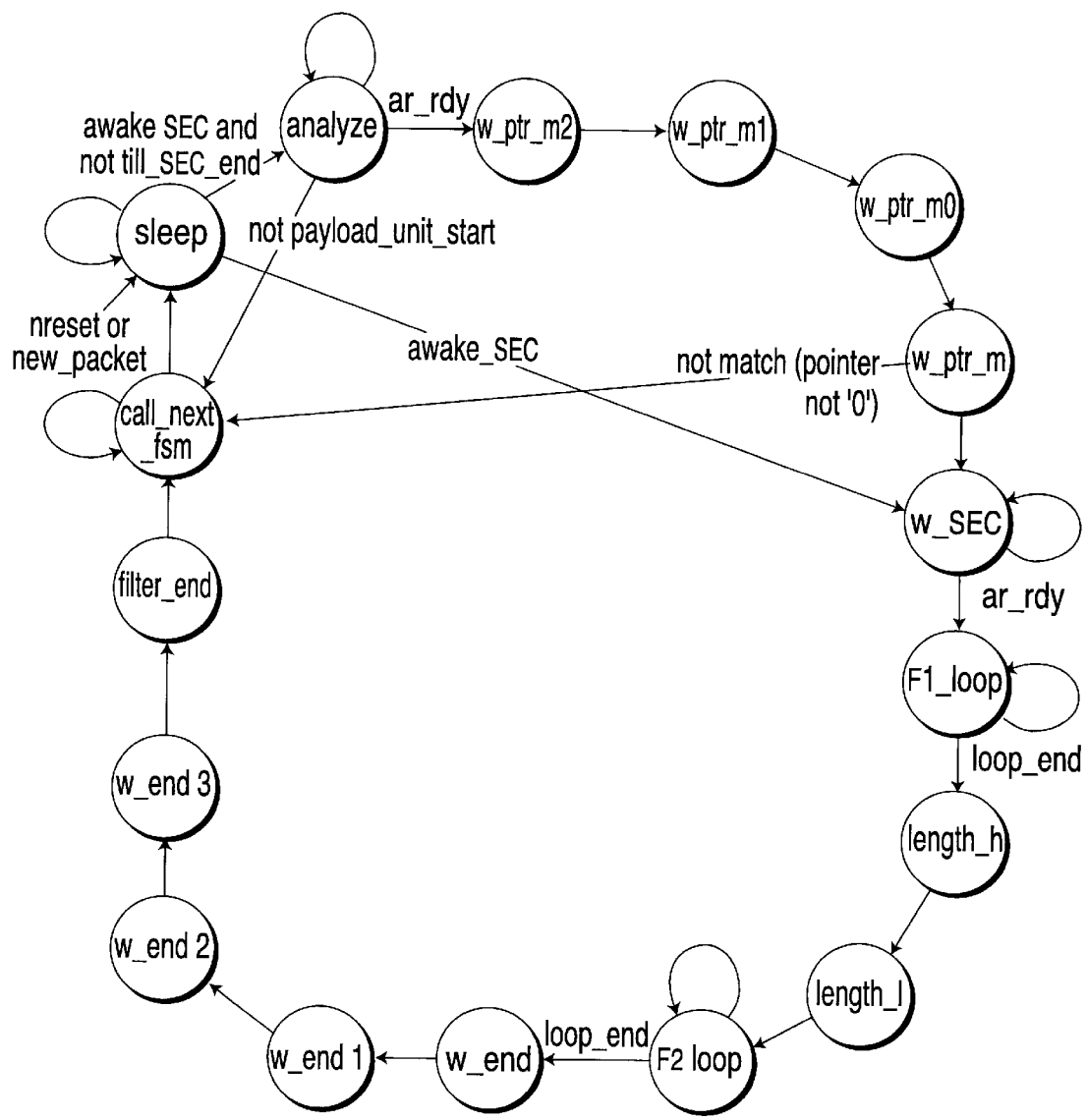
FIG. 4 is a state diagram of the section processor SEC of the demultiplexer in FIG. 1.

The processor SEC, designed to process the data of the section layer, contains a state machine (illustrated in FIG. 4) and four registers. It is activated by one of the processors TP or XFER. The bytes read by the processor are as follows:

| (a) | table_id | 8 b |
|---|---|---|
| (b) | section_syntax_indicator | 1 b |
|  | private_indicator | 1 b |
|  | reserved | 2 b |
|  | section_length (high semi-byte) | 4 b |
| (c) | section_length (low byte) | 8 b |
| (d) | First byte to be compared to the predefined groups | 8 b |
| (e) | Second byte to be compared to the predefined groups | 8 b |
| . . . |  |  |
| ( . . . ) | Last byte to be compared to the predefined groups | 8 b |
| ( . . . ) | Payload | N × 8 b |

The starting state is the sleep state. Two cases can arise when the processor SEC is activated:
the payload of the current transport packet contains the start of a section at its beginning,
the payload of the transport packet contains bytes of a section whose start has been transmitted in a preceding transport packet.

In the first case, the state changes to the wait state w_sec, which is maintained as long as a signal ar_rdy, indicating that the data capture memory is ready and contains at least 6 bytes, has not reached the processor SEC.

In the first case, the processor SEC points towards a section/stream field of the destination memory. This pointer is determined by the microcontroller for each authorised PID and is stored in registers read by the processor.

Each section/stream field having several groups of predefined bytes for the comparison with the bytes of the section of the transport packet, filtering of several parameters (EMM: ECM, allocation of programmes, etc. . . .) can be implemented for each stream.

The first byte to be read from the data capture memory at the start of the section is the table identification byte table_id. It is compared to the filter_nb bytes corresponding to the destination memory. This is represented by the loop around the F1_loop state.

The second and third bytes to be read are the section length bytes. In the present exemplary embodiment, the only comparison made is with the high semi-byte of the low byte of the section length, in order to check if the section extends beyond the current transport packet.

The section bytes are then compared to the predefined bytes stored in the destination memory (F2_loop and corresponding loop state). During the comparison with the bytes of one of the groups, one bit of a register (filter_reg) is set to 1 by the processor for each positive comparison. This information is retained from transport packet to transport packet if the section occupies more than one packet, in order to transfer the whole section to the switching part.

When one of the groups of predefined bytes is detected in a section, the section is transferred to the switching part (call_next_fsm state), once filtering is ended. If the end of one section has been transferred, an interrupt signal is then generated to indicate to the microcontroller that the entire section has been stored in the SRAM and that it is available there.

If no comparison with a group of bytes provides a positive result, then the section is rejected, and the control is returned to the processor TP.

In the second case, the processor SEC is activated when a section has already been started. The processor then analyses the register suspend_reg to determine if the end of the section present at the start of the payload of the transport packet corresponds to a section for which the comparison has been positive. In this case, the transfer processor is called (call_next_fsm state). In the opposite case, the processor SEC calculates the pointer (w_ptr) corresponding to the start of the following section in the same transport packet. The system then returns to filtering/comparison cycles (w_SEC state).

The processor SEC has four registers.. A first register (SECcount_reg) is used as the index in the two loops described in relation to the state machine. A second register (filter_reg) is used to store the results of comparison. This register contains filter_nb bits, each bit indicating the result of comparison for one of the groups of predefined bytes. A third register (suspend_reg) stores the results of filtering for each stream, for which the contents of one section occupying several packets can be transferred to the switching part. The end of section interrupts are also generated from this register. A last register (SEC_length_reg) is used to compute the length of the section.

In the present exemplary embodiment, all the bytes of the same section to be compared are assumed to be transmitted in the same transport packet. The other bytes of a section can be distributed among other transport packets.

The following part of the description particularly concerns the transfer processor XFER.

Figure 5:
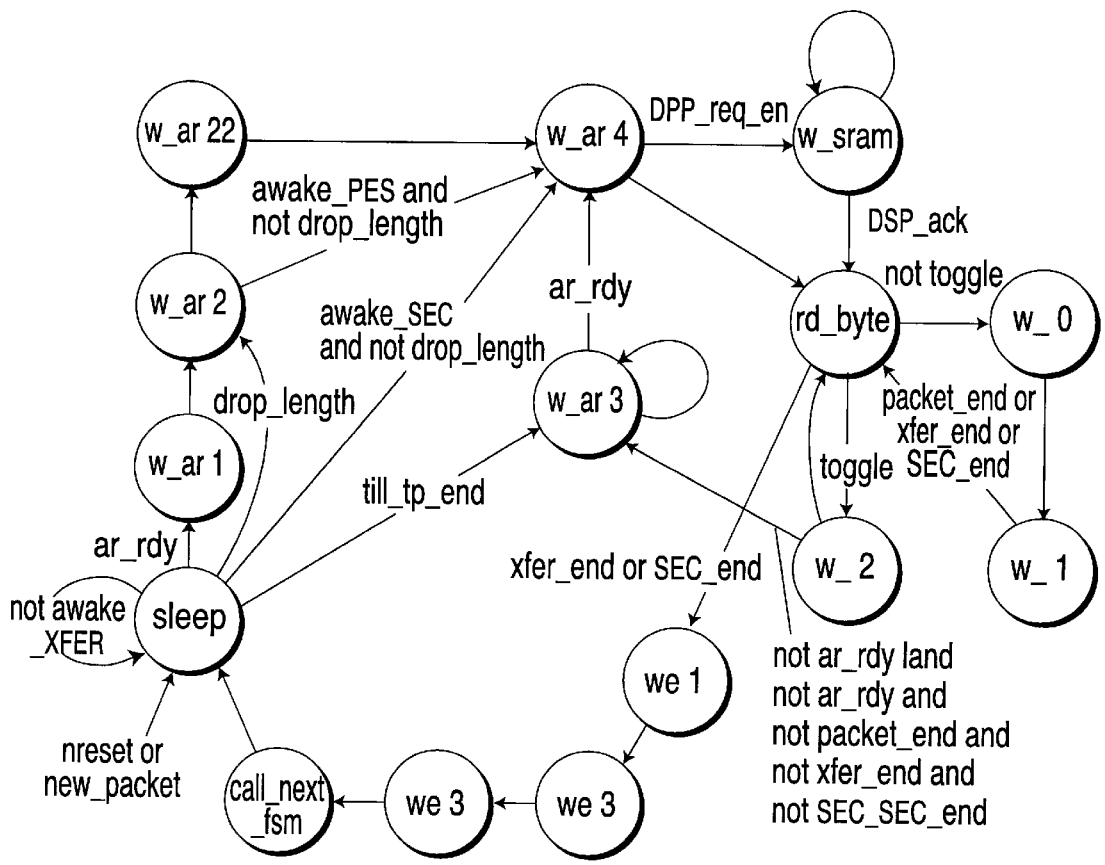
FIG. 5 is a state diagram of the transfer processor XFER of the demultiplexer in FIG. 1.

The processor XFER is activated by every other processor having data to be transferred to the switching part. It contains a state machine (FIG. 5), a register (packet_length_reg) and two counters: xfer_count_reg and ar_count. The processor XFER does not have access to the destination memory.

The register packet_length_reg contains the length of the packet, that is to say 188 bytes in the case of MPEG2 transport packets. An internal counter (packet_count_reg) is loaded with this start of transport packet value by the microcomputer and is decremented each time that a byte is read into the data capture memory.

The xfer_count counter is used by the processor XFER to store the number of bytes to be transferred.

The counter ar_count is used to generate type ar_rdy type signals (data capture memory ready). It synchronises the data coming from the demodulator/error corrector and compares the read and write pointers of the data capture memory.

The start state is again the sleep state.

If a signal till_TP_end has been activated by the calling processor, then the processor XFER transfers all the remaining bytes of the transport packet to the switching part. In the opposite case the processor reads the first byte in the data capture memory and considers it to be the number of bytes to be transferred. If the signal drop_length_bus is validated, then this first byte is not transmitted to the switching part. This function also depends on the processor having activated the processor XFER and on the number of bytes present in the data capture memory.

For each transfer session, the processor XFER expects 6 bytes to be available in the data capture memory or in the descrambler. It then opens a transfer session by sending a signal DPP_req (w_ard state) to the switching part and awaits the return of this part (w_sram state).

When the DSP is ready to receive data, it responds with a signal DSP_ack. The processor XFER then reads the bytes in the data capture memory (rd_byte state) and transfers them to the switching part. After a byte is transferred, the processor loops back to transfer the next byte until an end of transfer condition.: end of packet, end of section or end of transfer (w_0, w_1 and w_2 states).

If no end condition is fulfilled, then the processor waits (W_ar3 state) for another six bytes to be available in the data capture memory (ar_rdy=1) in order to formulate a new transfer session request.

In the case of the end condition, the processor XFER reactivates the processor which has activated it and goes into the sleep mode (call_next_fsm and sleep states).

We claim:

1. Demultiplexing device for a stream of multiplexed data arranged in a plurality of hierarchical layers, said device comprising:

means for storing data of the multiplexed data stream;

at least one processor dedicated to one layer from said plurality of hierarchical layers of data in the multiplexed data stream for processing said data layer;

programmable means for storing filtering data, wherein each said processor controls the reading of the stored filtering data corresponding to the layer to which the processor is dedicated;

comparison means for comparing the data of the multiplexed data stream and the read filtering data; and transfer means for transferring data of the multiplexed data stream to storage means according to the comparison results.

2. Device according to claim 1, wherein said layer to which said at least one processor is dedicated to is the MPEG2 transport layer, and wherein the filtering data comprises data values containing at least one of the following types: PID, continuity counter, synchronization bit.

3. Device according to claim 2, wherein values associated with filtering data correspond to the next value expected in the multiplexed data stream.

4. Device according to claim 1, wherein said layer to which said at least one processor is dedicated to is a MPEG2 section layer, and wherein the filtering data comprises data values containing at least the following types: table identifier, start of section pointer, section length.

5. Device according to claim 1, wherein said layer to which said at least one processor is dedicated to is a MPEG2 elementary stream packet layer, and wherein the filtering data comprises data values containing the stream identifier.

6. Device according to claim 5, wherein said device further comprises a multiplexer, one input of which is connected to the output of the means for storing data of the multiplexed data stream, and a second input of which is connected to the output of a descrambler, the input of the descrambler also being connected to the output of the means for storing the data of the multiplexed data stream, the multiplexer being controlled by at least one processor.

7. A demultiplexing device operable in a digital television receiving and decoding system for receiving a multiplexed data stream arranged in a plurality of hierarchical layers from a demodulation unit and demultiplexing said data stream to obtain demultiplexed data, said device comprising:

means for storing data of the multiplexed data stream;

at least one processor dedicated to one layer from said plurality of hierarchical layers of data in the multiplexed data stream for processing said data layer;

programmable means for storing filtering data, wherein each said processor controls the reading of the stored filtering data corresponding to the layer to which the processor is dedicated;

comparison means for comparing the data of the multiplexed data stream and the read filtering data; and transfer means for transferring data of the multiplexed data stream to storage means according to the comparison results.

* * * * *